Aug. 11, 1942. E. J. FINEGAN 2,292,873
BALL VALVE
Filed March 19, 1941
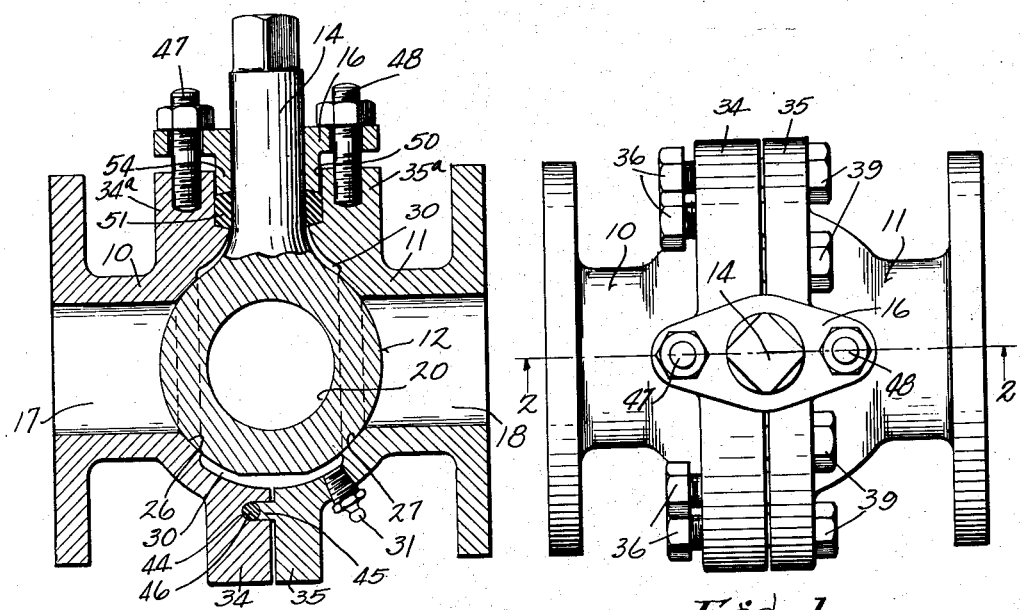
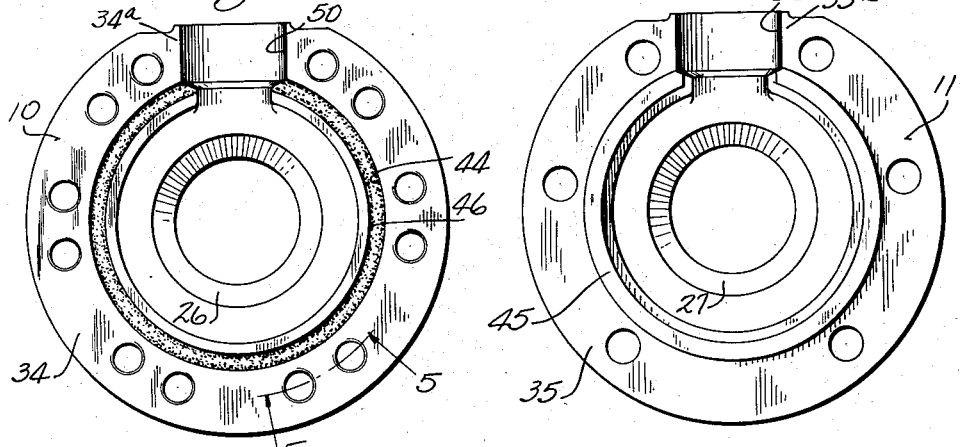
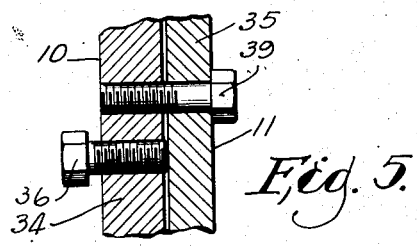
INVENTOR
ELLWOOD J. FINEGAN
BY
Wheeler, Wheeler & Wheeler Patented Aug. 11, 1942

2,292,873

UNITED STATES PATENT OFFICE 2,292,873

BALL VALVE

Ellwood J. Finegan, Nekoosa, Wis.

Application March 19, 1941, Serial No. 384,110

10 Claims. (Cl. 251—156)

This invention relates to improvements in valves, and more particularly to rotary valves of the ball type.

A primary object of the invention is to provide a rotary ball valve with means for adjusting the seating thereof without disassembly of the valve structure.

Further important objects are to provide a valve which, when open, will offer minimum obstruction to flow and which is particularly adapted for use in conduits through which fluid is conducted under high pressure, and which may be easily operated even when subjected to a high pressure differential within the conduit; and which, moreover, is adapted to handle without sticking or clogging liquids carrying a high percentage of solid or fibrous matter such as paper stock.

A further object is to provide improved means for sealing complementarily engaged housings forming the seat carrying casing of a ball type valve and to provide means for lubricating the seats thereof.

A still further object is generally to improve and simplify the construction and arrangement of valves for one or more of the above mentioned purposes, and particularly with reference to ball type rotary valves.

Still other objects and advantages of the invention will become apparent to persons skilled in the art upon an examination of the specification, drawing, and claims.

In the drawing:

Figure 1 is a top view of a valve structure with my invention incorporated therein.

Figure 2 is a vertical section taken along the longitudinal line 2—2 of Fig. 1.

Figure 3 is an elevational view showing the inner face of the right hand housing portion as viewed in Fig. 1.

Figure 4 is an elevational view showing the inner face of the left hand housing portion as viewed in Fig. 1.

Figure 5 is a section through a portion of the central flanges taken longitudinally of the device shown in Fig. 1 along the line 5—5 of Figs. 1 and 3.

Like parts are identified by the same reference characters throughout the several views.

With reference to Figs. 1 and 2, the illustrated valve assembly includes a pair of casing members 10 and 11 which are adjustably connected as hereinafter described to provide a central socket or chamber in which a spherical ball valve 12 is disposed. Valve 12 has a cylindrical stem 14 extending therefrom and journalled in a gland 16 to permit rotation of the valve in respect to a vertical axis as viewed in Fig. 2.

Casing members 10 and 11 are provided with bores 17 and 18 aligned upon assembly of the device to provide a passageway through the housing structure with valve 12 centrally disposed therein. Valve 12 is provided with a diametrical bore 20 at a right angle to the axis of stem 14, whereby passageway 20 may be registered with ports 17 and 18 when the valve is moved to a fully opened position, thus providing an unobstructed passageway through the valve assembly.

Casing members 10 and 11 have complementary recesses providing a generally spherical chamber for the valve 12. Casing member 10 is provided with a valve seat 26 at the inner end of port 17, and member 11 is provided with a valve seat portion 27 at the inner end of port 18. The walls of the spherical cavity are cut away inwardly of valve seats 26 and 27 to provide a channel 30 between valve 12 and the casing assembly for the reception of oil or grease which is preferably introduced therein through a pressure fitting 31 of a well known type.

Valve seats 26 and 27 are preferably conical rather than spherical, thereby assuring proper seating of the valve notwithstanding changes in relative position of the parts consequent upon casing adjustments.

Adjustment of valve seats 26 and 27 in respect to the spherical valve 12 is effected in the following manner:

Bolts 39 extend loosely through flange 35 of casing element 11 into threaded engagement with flange 34 of casing element 10, thus adjustably drawing the casing elements together in clamping engagement with the valve 12. The clamping pressure is limited by set screws 36 threaded in flange 34 and abutting the face of flange 35. In this manner any desired adjustments of the valve seats 26 and 27 may be accomplished from the exterior of the device without the necessity of disassembly of the unit.

To provide an efficient seal between channel 30 and the exterior of the assembled housing while allowing for relative adjustment between housing members 10 and 11, the inner face of flange 34 is provided with an annular channel 44 and the inner face of the flange 35 is provided with an annular rib 45 for complementary engagement therewith. The inner end wall of channel 44 is arcuately curved in cross section as is the end wall of rib 45, and a split packing ring 46, generally circular in cross section, is disposed within the channel for engagement between the channel and flange. Packing ring 46 is of resiliently compressible material to provide a fluid-tight seal between the flanges during all normal adjustments of the valve seats.

As shown in Fig. 2, flanges 34 and 35 have laterally enlarged portions 34a and 35a in the top thereof in which stud bolts 47 and 48 are anchored to extend through the apertured ear portions of gland 16, whereby to mount the gland in a well known manner, while permitting relative adjustment of the casing parts.

An extension plug 54 on gland 16 extends into a packing socket formed by complementary recesses 50 in the casing elements, such recesses intersecting the channel 46 and the rib 45. The packing 51, compressed by gland 16 and plug extension 54 thereof, abuts the ends of split packing ring 46, thereby completing the packing annularly about the valve 12 and at the same time providing packing for stem 14.

The valve is particularly adapted for use in conduits through which paper stock, sewage material, and the like flows, due to the valve being self-cleaning. Material lodging between the valve periphery and valve seat surfaces is sheared by the movement of the valve in respect to the seat upon manipulation thereof, whereby to clean the seat surfaces. However, when the valve is wide open it presents a full aperture continuing through the valve the full diameter of the inlet and outlet passages, whereby there will not, under such circumstances, be any appreciable possibility of material lodging at the valve.

I claim:

1. In a valve structure, the combination with ported casing elements adjustable to and from each other and each provided with an annular valve seat surrounding its port, of a ported valve rotatably mounted between said seats, means for the adjustable connection of said casing elements to clamp said seats against said valve, and adjustable stops carried by one of the casing elements to provide predetermined limits to the clamping pressure.

2. In a valve structure, the combination with a spherical valve provided with a stem and having a passage extending through the valve transversely with respect to the axis of said stem, of casing elements respectively providing inlet and outlet passages and annular conical seats surrounding said passages and adapted to engage said valve in planes spaced at opposite sides of said stem, the opposing faces of said casing elements being provided with mutually engaging arcuate packing devices, a packing for the stem engaging the ends of said packing devices and means for the adjustable connection of said casing elements in pressure engagement with such valve.

3. In a valve structure, the combination with a pair of casing elements having substantially aligned inlet and outlet passages, of a ball valve having a stem and a port disposed transversely of the stem and substantially corresponding in diameter to the inlet and outlet passages, throughout its length whereby to be registerable therewith to permit substantially unimpeded flow therebetween and avoid clogging of fibrous material, means connecting the casing elements adjustably about the ball valve, one of the elements being provided with an arcuate groove having therein a compressible packing, and the other element having an arcuate rib spanning the space between the elements and fitted to the groove in pressure relation to the packing therein, said packing including packing extending about said stem, and seats for said ball valve in the respective casing elements, each of said seats being of annular form and disposed about the respective passages in planes substantially parallel and spaced at opposite sides of said stem.

4. A valve structure comprising the combination with a pair of casing elements provided with passages and each having an annular seat surrounding its passage, of a ball valve provided with an aperture corresponding in diameter to said passages and rotatably registerable therewith, said valve being in pressure engagement with said seats, means for rotating said valve, and means for adjusting said casing elements to and from each other comprising a clamping connection between said elements and adjustable stops interposed between said elements to limit the clamping pressure of said seats against said valve.

5. In a valve structure, the combination with a ported ball valve, of separate casing elements having passages between which the port of said valve is adjustable to provide communication, said elements each being provided with a seat for said valve extending annularly about its respective passage, a stem for said valve projecting laterally from between said elements, packing interposed between said elements about said stem, a packing gland provided with pressure connections to the respective elements, and complementary packing means coacting with the packing about the stem to provide a continuous ring of packing between said elements, and means connecting said elements for drawing them together on said packing and upon said valve.

6. The device of claim 5 in which one of the casing elements is provided with a rib in the form of a split ring extending about its seat and the other is provided with a complementary groove extending in the form of a split ring about its seat, the aforesaid packing between said elements being positioned in the groove and subject to the pressure of the rib, and the valve stem packing being complementary to the packing between said elements and disposed between the ends of the groove and the rib.

7. In a valve structure, the combination with a ball valve having a stem and a diametrical port normal to the stem, of casing elements having passages corresponding in size to said port and with which said port may be aligned by rotation of said stem to provide unimpeded communication, said casing elements having annular seats of frusto-conical form about their respective passages in pressure engagement with said ball valve and between which said ball valve is rotatable, one of said elements having outside of its said seat a recess adjacent the stem and a channel extending about the seat and communicating at its ends with said recess, the other of said elements having a complementary recess adjacent the stem and a rib extending around its said seat and terminating adjacent said recess in opposition to said channel, packing in the aforesaid recesses about the valve stem, additional packing extending about said channel and compressed by said rib and abutting at its ends the packing about the stem, clamping means for drawing the casing elements together upon the valve, means for limiting the pressure of the casing elements upon the valve, and a packing gland provided with pressure connections independently to the respective casing elements and having a plug portion of annular form fitted about the stem and extending into said recesses for compression of the packing about the stem.

8. In a valve structure, the combination with a ported ball valve, of separate casing elements ported for registry with the valve port in one position of valve adjustment, said ports being uniformly of equal diameter throughout their length and said elements being each provided with an annular seat for said valve concentric with its port, a stem for said valve projecting laterally from between said elements, packing concentric with the valve stem, cooperative packing means closing the joint between the elements, encircling the valve and spaced therefrom, and a body of lubricant interposed between said packing means and the valve.

9. A valve structure as set forth in claim 5, in which the casing elements are arcuately recessed between said complementary packing means and the valve to provide an arcuate grease cup extending from one side of the valve stem to the other.

10. In a ball valve structure of the type in which a ported oscillatory ball is clamped between ported casing elements having conical annular seats concentric with the ports, the combination therewith of means for limiting the clamping pressure of the seats upon the ball, and means for holding a body of solid lubricant against the ball throughout the area between the seats.

ELLWOOD J. FINEGAN.